United States Patent [19]
Chauvire et al.

[11] Patent Number: 6,062,609
[45] Date of Patent: May 16, 2000

[54] CUFF FOR CONNECTING TO AN EQUIPMENT, PARTICULARLY A PIPE

[75] Inventors: Pascal Chauvire, Paris; Serge Houlot, Maurepas, both of France

[73] Assignee: Compagnie Generale des Matieres Nucleaires, Velizy-Villacoublay, France

[21] Appl. No.: 09/055,833

[22] Filed: Apr. 6, 1998

[30] Foreign Application Priority Data

Apr. 8, 1997 [FR] France .................................. 97 04270

[51] Int. Cl.⁷ .................................................. F16L 19/00
[52] U.S. Cl. .......................... 285/326; 285/38; 285/311; 285/916
[58] Field of Search .................................... 285/326, 311, 285/312, 320, 38, 916

[56] References Cited

U.S. PATENT DOCUMENTS

| 969,019 | 8/1910 | Wilson et al. ........................... 285/311 |
| 1,878,826 | 9/1932 | Cederstrom ............................. 285/311 |
| 3,330,299 | 7/1967 | Slawinski et al. .................. 285/326 X |
| 4,103,712 | 8/1978 | Fletcher et al. . | |

FOREIGN PATENT DOCUMENTS

| 145726 | 5/1936 | Austria .................................. 285/311 |
| 0251860 | 1/1988 | European Pat. Off. . | |
| 2847901 | 5/1980 | Germany . | |
| 1020540 | 2/1966 | United Kingdom . | |

OTHER PUBLICATIONS

Patent Abstracts of Japan, vol. 95, No. 2, Mar. 31, 1995, & JP 06 307592 A (Nippondenso Co Ltd), Nov. 1, 1994.

Primary Examiner—Dave W. Arola
Attorney, Agent, or Firm—Pearne, Gordon, McCoy & Granger LLP

[57] ABSTRACT

The cuff (25) for connecting a tube (26) to two pipes (2) or two equipments together includes, at each end, a knuckle joint mechanism (31) bearing on a clamp (3) integral with the pipe (2) and which forces the end of the tube (26) against the mouth (4). The knuckle joint (31) is two pairs of rods (32, 35), whose interference produces a compressive stress on spring washers (37). The fixing force is consequently applied in simple and reliable manner and can be interrupted just as easily. The bearing surfaces of the connecting parts and the tube (26, 30, 43) with respect to one another, on the clamp (3) and the mouth (4) must be spherical and concentric in order to enable the pipes (2) to be angularly displaced by a few degrees relative to the tube (26).

5 Claims, 4 Drawing Sheets

CUFF FOR CONNECTING TO AN EQUIPMENT, PARTICULARLY A PIPE

BACKGROUND OF THE INVENTION

The invention relates to a cuff for connecting to an equipment, which can in particular be a pipe.

It can be used for ensuring the continuity of two equipments provided with conduits locating substantially in extension of one another, but at the mouths separated by a certain distance and permitting the circulation of a fluid or other content from one conduit to the other. Therefore such a cuff must comprise a tube, whose ends are fitted to the mouths of the conduits and means for fixing or clamping the ends of the tube to the respective conduits.

The respective position and orientation of the equipments must be defined with great precision in order that the connection or coupling offered by the cuff is perfectly tight, even if there is a certain latitude as a result of the possibility of interposing elastic joints or bellows, crushed to a greater or lesser force as a function of the clearances encountered, between the mouths of the conduits and the ends of the tube. These problems are complicated when the mouths are liable to be mutually displaced with time or when a direct manipulation of the cuff is impossible, which is the case when it is located in a hostile environment where remote manipulation is indispensable. However, such manipulations are necessary for periodically replacing the joints or the cuffs.

A tube cuff is known formed by at least one rigid section and whereof FIG. 1 shows one end, the other being symmetrical. A tube 1 of the cuff is connected by its end to a pipe 2 equipped with a clamp 3 extending in front of its mouth 4. The clamp 3 has an opening 5 in front of the mouth 4 and which extends level with the clamp 3, forming a cuff introduction or dismantling passage 6. The clamp 3 forms with a collar 7 around the mouth 4 and connecting, intermediate flanks 8 (whereof only one is shown) a receptacle 9 open at its top and into which is introduced one of the ends 10 of the tube 1 and one of the ends (equipped with a collar 15) of the cuff 12, which are then placed on the bottom of the opening 5, whilst being pressed against the mouth 4, accompanied by the interposing of a sealing O-ring 11 (provided with a gripping tongue permitting easy positioning).

A sleeve 12 placed round the tube 1 and permitting the fastening of the end 10 also passes through the opening 5. The collar 15 established at its end located in the receptacle 9 then approaches the inner face 16 of the clamp 3, oriented towards the mouth 4, until it touches said inner face 16. Once the collar 15 is wedged by means of the washer 17 on the inner face 16 of the clamp 5 by imposing thereon a rotation about its axis, the rotation of the sleeve 12 brings about the translation of the tube 1, whose end 20 fixes the joint 11 on the pipe 4. The sleeve 12 is turned by a capstan 18 fixed to its outer periphery and which can be actuated by a not shown, specialized machine and it is possible to fix a remote manipulator. The tube 1 can be provided with an anti-torque positioning plate 19 not far from the sleeve 12 in order to prevent it from turning during screwing and unscrewing. A washer 17 is intercalated and fixed between the clamp 3 and the collar 15. Its faces directed towards said two parts have shapes complimentary of the faces against which they are intended to bear, so as to bring about a stable bearing on a large surface. The mutual bearing faces of the collar 15 and the washer 17 are spherical in order to compensate the lack of parallelism of the sleeve 12 with the tube 2 during putting into place. However, with said cuff, it is relatively difficult to regulate the fixing force, which is dependent on the characteristics of the specialized machine and the friction in the thread 14 and between the collar 15, washer 17 and inner face 16. Moreover, the transmission efficiency by meshing between the capstan 18 and the specialized machine is mediocre. The fixing or fastening effect stops as soon as the specialized machine has to apply a rotary torque exceeding that for which it has been set, no matter what the position obtained. The thread 14 can also give rise to jamming phenomena, which would make the cuff very difficult to dismantle. Finally, it is difficult to ensure that the washer 17 remains correctly positioned during installation, because the rotation of the collar 15 can lead to movement thereof even in the upwards direction despite the precautions taken, so that the end 10 of the tube 1 will no longer be appropriately matched with the mouth. These failure possibilities with respect to fitting or dismantling make the cuffs of FIG. 1 inadequate. Another of their disadvantages is their excessive rigidity, which prevents them from adapting to the movements of the pipes 2 and in particular to the rotary displacement movements of the axis of the tube 1 relative to the axis of the pipe 2. The border 20 of the end 10 of the tube 1, which bears on the O-ring 11, is given a spherical shape in order to maintain the sealing action if the end 10 rotated with respect to the mouth 4, but the nature of the connection between the tube 1 and the pipe 2, particularly at the location of the washer 17, does not make it possible to ensure that such a rotary movement is in fact obtained. The O-ring 11 may become inadequate for producing the desired sealing action.

BRIEF SUMMARY OF THE INVENTION

Therefore the object of the invention is to propose a cuff for connecting between two equipments, whose installation is easy and reliable, even when having to use a remote manipulator, and it is also desirable for the sealing of the connection or coupling to be maintained even when the equipments to be joined by the cuff are subject to small translatory or rotary movements.

All this is obtained with a cuff for connecting to an equipment having a mouth preceded by a clamp having an opening positioned in front of the mouth, said opening being terminated by a lateral, cuff fitting and dismantling passage, the cuff having a tube fitted to the mouth of the equipment and traversing the opening of the clamp, a sleeve placed around the tube, the sleeve traversing the opening and having a splaying collar bearing on one face of the clamp turned towards the mouth of the equipment, and a control mechanism for making the tube slide outside the sleeve. The cuff is characterized in that the control mechanism is a knuckle joint constituted by a ring, a connecting pin, a pair of linkages with parallel pins, the linkages being joined to the connecting pin by at least one articulation and respectively articulated to the ring and to the sleeve, the ring moving along the tube and surrounding the tube, and deformed spring washers between the ring and an abutment located on the tube.

The sleeve and collar are constituted by two parts joined by spring washers and by spherical sliding surfaces to the collar, one of the parts being articulated to the first of the linkages and the other of the parts bearing on the face of the clamp turned towards the mouth, said face being planar, by means of a face having a complimentary shape and as a result of which the sealing of the coupling is more easily safeguarded. This is even more the case if the tube is fitted to the mouth by a spherical surface concentric to the spherical sliding surfaces.

BRIEF DESCRIPTION OF SEVERAL VIEWS OF THE DRAWING

The invention is described in greater detail hereinafter relative to the attached drawings, wherein show.

DETAILED DESCRIPTION OF PREFERRED EMBODIMENTS

Figure 1:
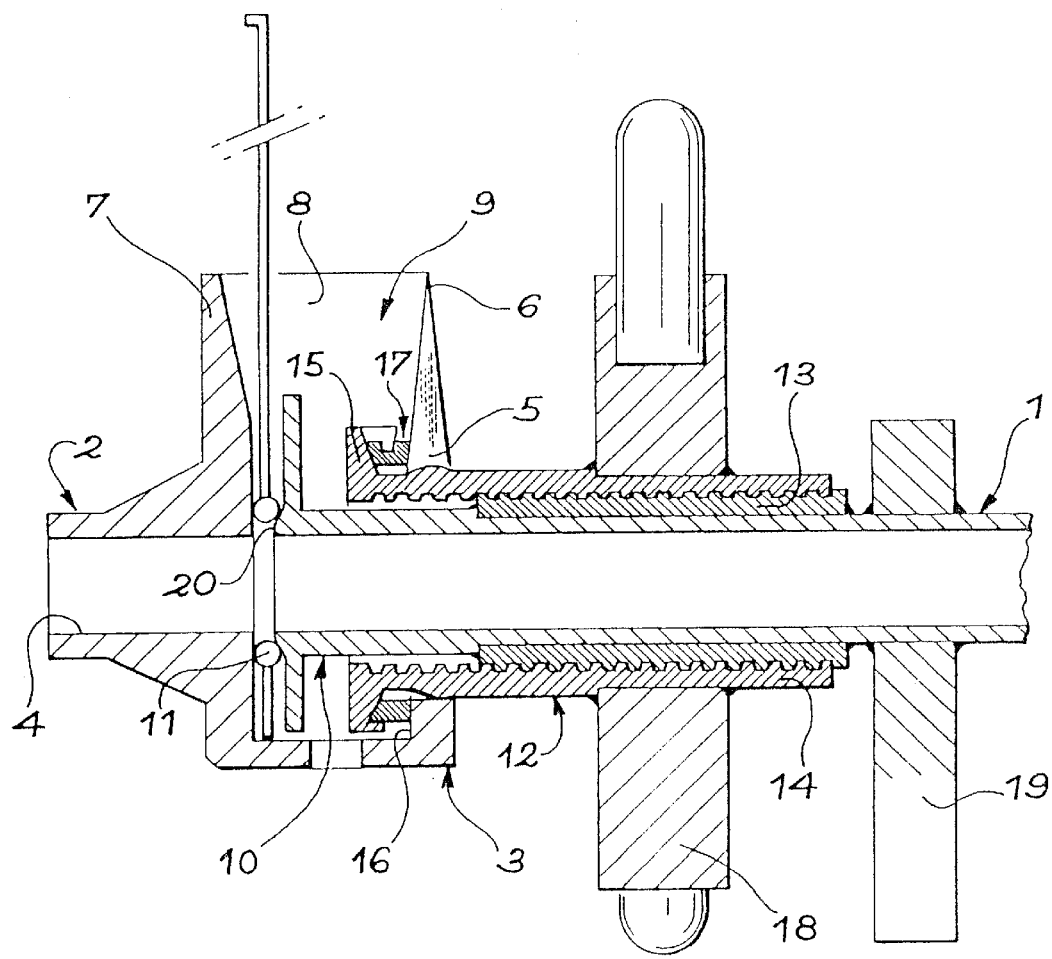
FIG. 1, already described, a portion of a prior art coupling cuff.
Figure 2:
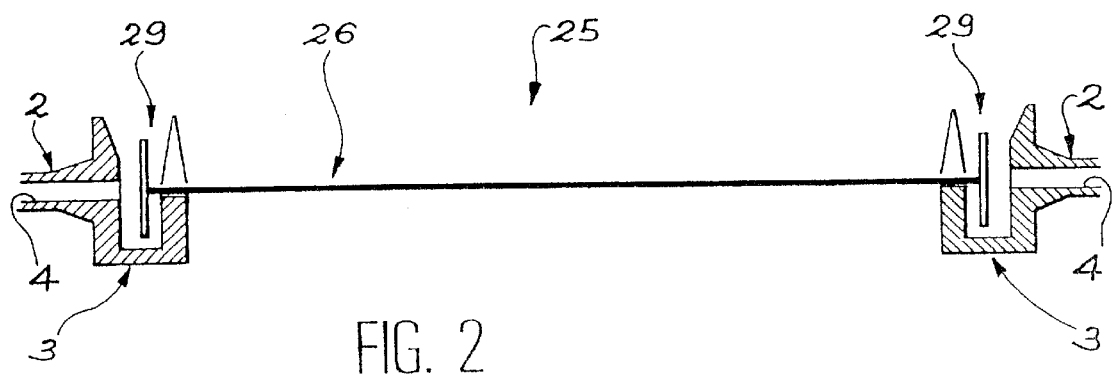
FIG. 2 a diagrammatic representation of a complete cuff.
Figure 3:
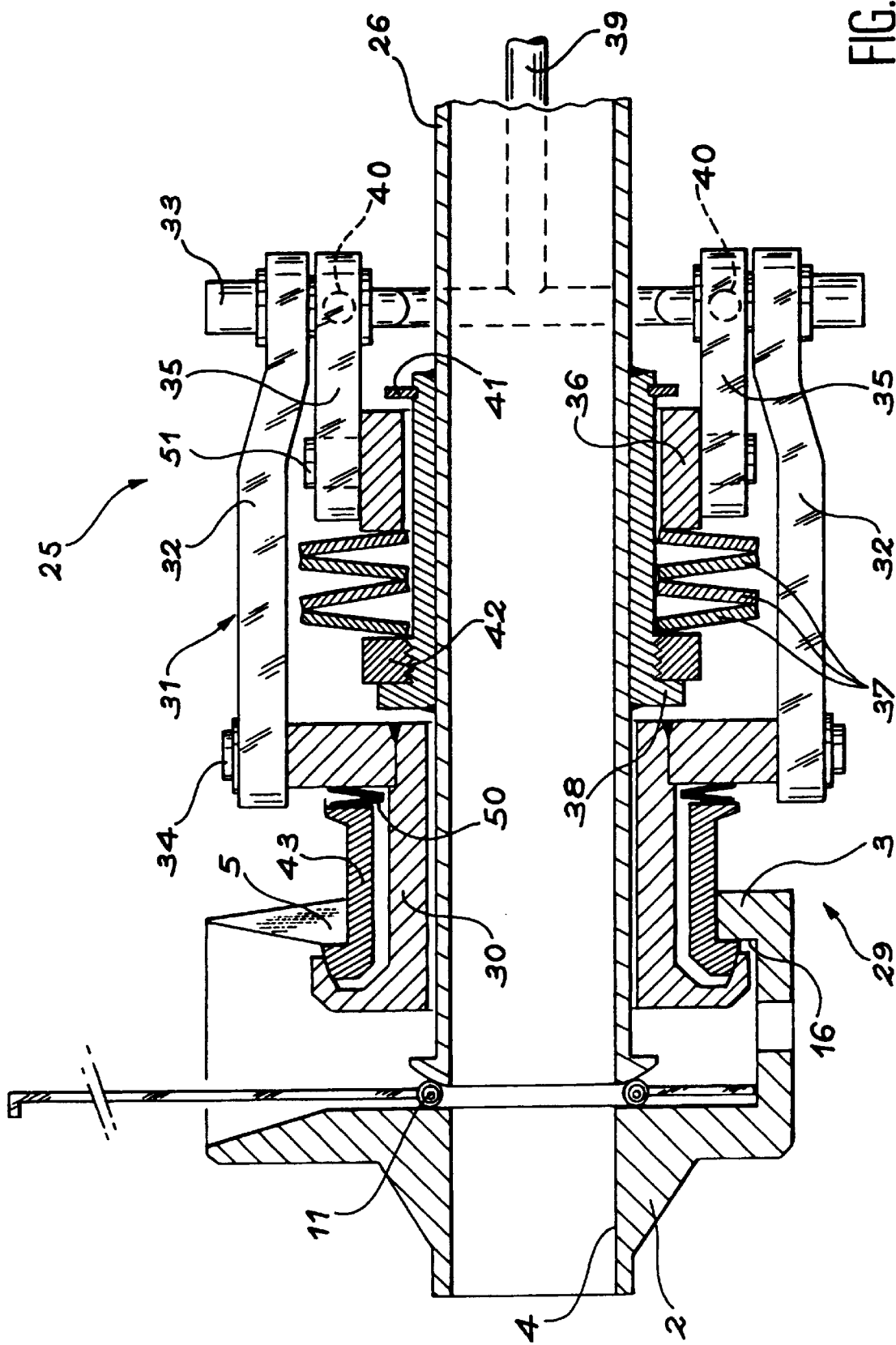
FIG. 3 a cuff end according to the invention in a view corresponding to FIG. 1.

The coupling cuff according to the invention is illustrated in FIG. 2 and carries the reference 25. It is placed between the mouths 4 of two pipes 2 equipped with clamps 3 in accordance with what has been stated relative to FIG. 1. It is essentially constituted by a tube 26 provided with ends 29 partly engaged between the mouths 4 of the pipes 2 and the clamps 3 preceding them, as in the previous embodiment. Reference should be made to FIG. 3 for a description of said ends 29.

The tube 26 is still retained against the mouth 4 of the pipe 2 by a sleeve applied to the inner face 16 of the clamp 3, but said sleeve 30 is no longer connected to the tube 26 by a thread, but instead slides thereon and is connected thereto by a completely different knuckle joint mechanism 31. The knuckle joints designate mechanisms having different constructions. In the present case it essentially comprises a pair of mutually articulated linkages, each having two diametrically opposite rods along the tube 26. The rods 32 of one of the linkages are articulated between a connecting pin 33 and another pin 34, integral to the sleeve 30, whereas the rods 35 of the second linkage are articulated by means of a pin 51 to a ring 36 sliding along the tube 26 and joined at their other end to the connecting pin 33. All the articulation pins are parallel to one another and perpendicular to the elongation direction of the tube 26.

Figure 4:
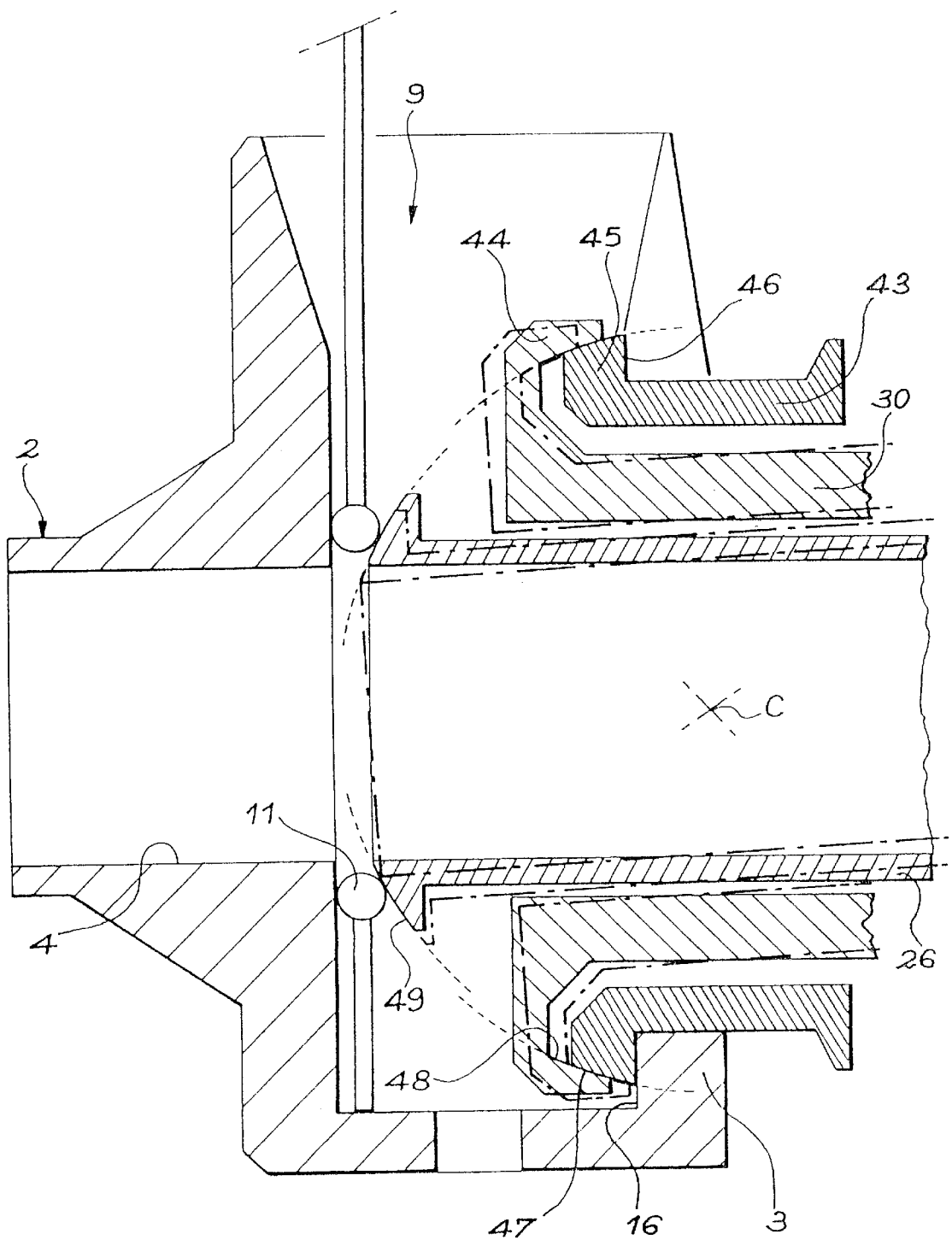
FIG. 4 a detail of the cuff and more particularly its portion between the pipe mouth and the joining clamp.
Figure 5:
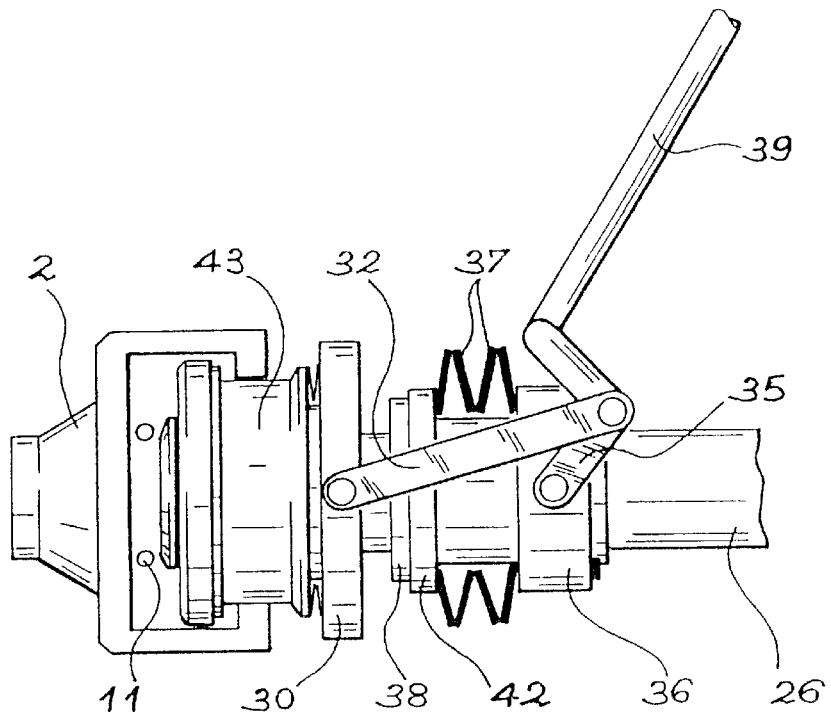
FIGS. 5 and 6 two other side views of the cuff for two different states thereof.
Figure 6:
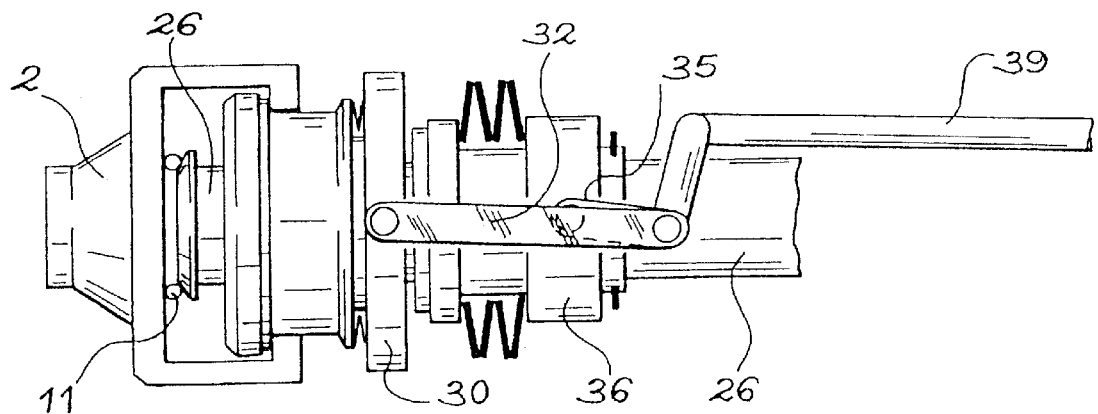

A stack of spring washers 37 is placed in front of the ring 36, on the side of the pipe 2, and the stack of washers 37 abuts forwards on a shoulder 38 of the tube 26. It is consequently compressed between the shoulder 38 and the ring 36, when the latter is subject to a displacement towards the mouth 4. This displacement results from a movement of the connecting pin 33 towards the tube 26, which straightens the rods in the sense that the greater length of the rods approaches a position parallel to the axis of the tube 26. The sleeve 30 is then attracted to the right in the drawing. As soon as it abuts against the clamp 3, the action of the rods 35 on the ring 36 compresses the spring washers 37 and drives the tube 26, whose head compresses the O-ring 11, against the pipe 2. The maintaining in the fixed position is guaranteed on passing beyond the equilibrium position known as cusp, obtained when the articulation pins 33, 34 and 51 of rods 32 and 35 are aligned. The rods 32 and 35, interfering in said state with the axis 34, prevent the accidental unfastening of the cuff 25, but it is very easy to dismantle it from the clamp 3 by pulling on the connecting pin 33 in order to bring the rods 32 and 33 to the side, to a position where the greater length of the rods approaches a position perpendicular to the axis of the tube 26. FIGS. 5 and 6, which illustrate the knuckle joint 31 in the relaxed position and secured position respectively, make it possible to understand this interfering phenomenon by showing that the locking of the linkages 32 and 35 can be produced after they have crossed when turning and the lever 39 abuts against the tube 26. The stack of spring washers 37 exerts a force maintaining the state of FIG. 6. The connecting pin 33 can be provided with a lever 39 or an equivalent means permitting the easy manipulation thereof and said lever can be prevented from striking on stopping the rotation of the connecting pin 33 relative to one of the linkages, e.g. by joining it by lugs 40 the rods 35 articulated to the ring 36. An excessive rearward movement of the ring 36 is prevented by a lock washer 41 placed around the tube 26 or by any appropriate means. Finally, the compressive stress supplied by the washers 37 can be regulated by sliding a shim 42 between them and the abutment 38. This shim 42, inserted when the ring 36 is moved rearwards and the washers 37 are free, is often a nut locked on installation with a lock washer. The sleeve 30 does not bear directly on the clamp 3, but instead by means of an external sleeve 43 sliding around it. Reference should be made to FIG. 4 for the following part of the description. The sleeve 30 carries a collar 44 widening around it between the flange 3 and the mouth 4 and which covers another collar 45, which widens around the external sleeve 43 to which it belongs. The two collars 44 and 45 extend into the receptacle 9. When the cuff 25 is installed, the collar 45 bears on the inner face 16 of the clamp 3 by a complimentary shaped, e.g. planar face 46, which consequently ensures a solid bearing action, whilst the collar 44 of sleeve 30 abuts on an opposite face 47 of the collar 45. According to the invention said opposite face 47 and the face 48 of the collar 44 bearing thereon are both spherical and have the same radius, as well as the same center C, so that the sleeves 30 and 43 can slide within one another without compromising the bearing action between their collars 44 and 45. According to the invention the end face 49 of the tube 26, in contact with the O-ring 11, is also spherical and of the same centre C as the aforementioned faces 47, 48 (but does not necessarily have the same radius). Thus, if the pipe 2 is subject to a rotary action, it moves with it the external sleeve 43, but the sleeve 30 and tube 26 do not move and there is simply a sliding of the face 47 and the joint 11 thereon, without any significant variation to the fastening force of the cuff 25. A spring 50 (FIG. 3) joins the external sleeve 43 to the sleeve 30 for returning the same to the coaxial position.

We claim:

1. Cuff (25) for connecting an equipment (2) having a mouth (4) and a wall (3) axially spaced therefrom, the wall (3) having a face (16) directed toward the mouth (4) and an opening (5) intermediate the wall and the mouth (4) and terminated by a lateral fitting and dismantling passage (6) for fitting the cuff into the opening and dismantling the cuff from the opening, the cuff comprising a tube (26) adapted to operatively engage and seal the equipment about the mouth (4) of the equipment and extendable through the opening (5) of the wall, said tube having an abutment fixed against axial movement thereto, a sleeve (30, 43) around the tube (26) and slidable along the tube, the sleeve being extendable through the opening (5) and having a collar (44, 45) bearable on the face (16) of the wall, and a control mechanism for making the tube (26) slide within the sleeve (30), wherein said control mechanism is a knuckle joint (31) which includes a ring (36) located about the tube (26) and slidable along the tube (26), a connecting pin (33), first and second linkages (32, 35) having parallel pins, the first and second linkages each having one end pivotably joined to the connecting pin

(33) and another end pivotably joined respectively to the sleeve (30, 43) and to the ring (36) by the parallel pins, and at least one first spring (37) located between the ring and the abutment of the tube to urge said tube toward said mouth, and wherein the sleeve (30, 43) and the collar (44, 45) are formed by two parts engaging one another at spherical sliding surfaces (47, 48) and at least one second spring means for urging said spherical sliding surfaces into engagement, one of the parts (30, 44) being joined to the first linkage (32) and the other of the parts (43, 45) having a face (46) with a shape complimentary to the face (16) of the wall and bearable on the face (16) of the wall.

2. Cuff according to claim 1, wherein said tube (26) has a spherical face (49) engagable with the equipment about the mouth of the equipment and said spherical face is concentric to the spherical sliding surfaces (47, 48).

3. Cuff according to claim 1, wherein said second linkage (35) is joined to the connecting pin (33) by a fixed connection (40) preventing relative rotation thereof and the pin carries a lever (39) for rotating the pin.

4. Cuff according to claim 1, wherein an adjusting nut (42) is located between the abutment (38) and the first spring (37) to adjust forces supplied by the first spring.

5. Cuff according to claim 1, wherein there are a plurality of first springs and said first springs are spring washers.

* * * * *